United States Patent [19]
Yoshino et al.

[11] Patent Number: 5,347,888
[45] Date of Patent: Sep. 20, 1994

[54] METHOD FOR FORMING A BEAD FORMING DIE

[76] Inventors: Nobuo Yoshino, 74-4, Oaza Hakoda, Kumagaya-shi, Saitama 360; Kuniaki Numaya, 24-11, Naritahigashi 3-chome, Suginami-ku, Tokyo 166, both of Japan

[21] Appl. No.: 63,481

[22] Filed: May 19, 1993

Related U.S. Application Data

[62] Division of Ser. No. 768,181, Oct. 11, 1991, Pat. No. 5,226,306.

[30] Foreign Application Priority Data

Feb. 15, 1990 [JP] Japan ................... 2-34513

[51] Int. Cl.$^5$ .......................... B21K 5/20; B21D 37/20
[52] U.S. Cl. ....................................... 76/107.1
[58] Field of Search ................ 76/107.1, 107.8; 72/334, 335, 336, 339, 328, 329, 404, 356, 312–314, 427

[56] References Cited

U.S. PATENT DOCUMENTS

| | | | |
|---|---|---|---|
| 798,530 | 8/1905 | Rehfuss et al. | 72/328 |
| 1,701,546 | 2/1929 | Shaw | 76/107.8 |
| 2,177,027 | 10/1939 | Plumb | 72/328 |
| 2,413,591 | 4/1944 | Sturdy | 72/328 |
| 2,434,375 | 1/1948 | Van Saun | 72/336 |
| 2,879,843 | 3/1959 | Comoglio | 76/107.1 |
| 2,989,936 | 6/1961 | Farnsworth et al. | 72/335 |
| 4,112,732 | 9/1978 | Okunishi et al. | 72/334 |
| 4,606,213 | 8/1986 | Persson | 72/312 |

FOREIGN PATENT DOCUMENTS

| | | |
|---|---|---|
| 58-25816 | 2/1983 | Japan . |
| 61-115625 | 6/1986 | Japan ................... 72/334 |
| 63-34754 | 9/1988 | Japan . |

*Primary Examiner*—Daniel C. Crane
*Attorney, Agent, or Firm*—Keck, Mahin & Cate

[57] ABSTRACT

A progressive bead forming metal die for forming beads in a metal gasket is constituted by a bead-forming die disposed between a hole punch die and an outer profile punch die. The bead-forming die comprises a pair of upper and lower inner bead boundary base blocks supported by upper and lower holders for pressing a desired bead shape and inner-bead flat sections, a stripper disposed so as to slide along the outer surface of the upper inner bead boundary base block, a die secured in contact with the outer surface of the inner bead boundary base block and disposed facing the stripper, a stopper disposed between the stripper and the upper holder to press-form an out-bead flat section between and by the stripper and the die when the upper and lower inner bead boundary base blocks are brought into press contact with each other, and an elastic member for urging the stripper toward the die.

5 Claims, 5 Drawing Sheets

METHOD FOR FORMING A BEAD FORMING DIE

This is a divisional of application Ser. No. 07/768,181, filed Oct. 11, 1991, now U.S. Pat. No. 5,226,306.

TECHNICAL FIELD

The present invention relates to a bead forming metal die for forming beads in a metal gasket which is inserted and bolted between contact surfaces of a cylinder head and a cylinder block of an internal combustion engine, and, more particularly, to a bead forming metal die, having a bead forming die disposed between a hole punch die section and an outer profile punch die, used in a progressive pressing in which a metal plate is progressively moved for punching out holes, forming beads and punching out a profile of a gasket, in order.

TECHNICAL BACKGROUND

For forming a gasket from a metal strip by the use of a punch, after punching out a desired profile of a gasket from a metal strip by the use of a single shot type die, a bead forming process is necessary to form a bead in the punch-out part for an increased sealing property.

Conventionally, these processes are independently performed through single shot processes in such a way to punch out a gasket, punch out holes in each gasket and, then, form beads in the gasket. Because of the necessity of at least two independent processes for each gasket, such a bead forming manner is inefficient and is one of cost raising factors.

In recent years, in such circumstances, an improvement has been made to decrease the number of steps by progressively moving a metal strip to a hole punch die and an outer profile punch die arranged side by side, which are conventionally, independently used as single shot dies.

However, even in this manner, although the hole punch die and an outer profile punch die are progressively put in processes, the bead forming must be performed in an independent process.

The present invention has made due to the nature of conditions and has an object to provide a bead forming die for forming beads in a gasket which allows at least three processes of punching holes, forming beads and punching an outer profile of gasket in a progressive process.

DISCLOSURE OF THE INVENTION

The present invention relates to a progressive pressing type of bead forming metal die for forming gasket beads constituted by a bead forming die, for forming beads surrounding sealing sections, disposed between a hole punch die and a outer profile punch die, characterized in that the bead forming metal die comprises a pair of, upper and lower, inner bead boundary base blocks supported by upper and lower holders for pressing a desired shape of beads and in-bead flat sections, a stripper disposed so as to slide along the outer surface of the upper inner bead boundary base block, a die secured in contact with the outer surface of the inner bead boundary base block and disposed facing the stripper, a stopper, disposed between the stripper and the upper holder, which is adjusted in height so as to press and form an out-bead flat section between and by the stripper and the die when the upper and lower inner bead boundary base blocks are brought into press contact with each other, and an elastic member for urging the stripper toward the die.

According to the structure, pressing a metal gasket, including punching holes, forming beads and punching an outer profile, is performed by progressively moving a metal strip, and a desired shape of bead and an in-bead flat section is press formed by bringing the upper and lower inner bead boundary base blocks into press contact with each other.

Because the stripper disposed around the outer surface of the upper inner bead boundary base block faces the die disposed around the outer surface of the lower inner bead boundary base block, and the stopper is adjusted in height so that the corresponding surfaces of the stripper and die are brought into press contact simultaneously when the upper and lower inner bead boundary base blocks are brought into press contact, an out-bead flat section is press formed by a pressure caused by the facing surfaces of the stripper and die without producing wrinkles during forming the beads. The stripper further serves as a means for removing swarf which is produced when the hole punch die and a outer profile punch die punch out holes and an outer profile of gasket.

Because the stripper guides the outer surface of the upper inner bead boundary base block, the adjustment of working surfaces of the upper and lower inner bead boundary base blocks in position is made precisely, so that the bead forming die is disposed between the hole punch die and a outer profile punch die without lowering the characteristics and performance of the hole punch die and a outer profile punch die.

Furthermore, due to the same surface configuration of the stripper as the die facing the stripper, the upper and lower inner bead boundary base blocks are identically shaped to each other, so that beads reversely related in shape can be produced by the upper and lower inner bead boundary base blocks replaced with each other.

In addition, due to the stripper being disposed along the outer surface of the upper and lower inner bead boundary base blocks, the concave groove and the convex projection being formed along the outer surface of the upper and lower inner bead boundary base blocks, and the concave groove being formed in the outer periphery of the working surfaces of the upper and lower inner bead boundary base blocks, gaskets are produced with a favorable shape of beads without adverse effects of the boundary between the stripper and the upper and lower inner bead boundary base blocks.

BRIEF DESCRIPTION OF THE DRAWINGS

FIGS. 1 through 10 show a metal die for forming beads in a metal gasket, wherein FIGS. 1(a), (b) are cross-sectional views showing part of a bead forming metal die for forming a step bead;

FIG. 6 is a plan view showing a working surface of a female die of a progressive pressing die;

FIG. 7 is a perspective view of a metal gasket made by the progressive pressing die shown in FIG. 6;

FIG. 8 is a schematic cross-sectional view illustrating a bead forming metal die;

FIG. 9 is a schematic perspective illustration of a projection member of a male metal die; and FIG. 10 is a cross-sectional view of an essential part of a metal gasket bead forming metal die provided in the manner as shown in FIG. 8.

BEST EMBODIMENT OF THE INVENTION

Embodiments of the present invention will be hereinafter described with reference to the drawings.

Figure 6:
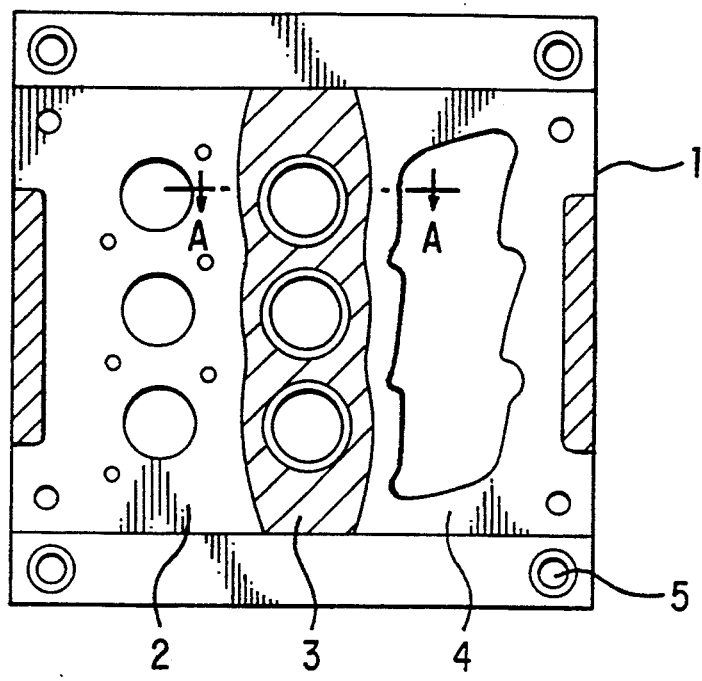

Firstly, a progressive pressing die of the present invention, as shown in plan view of a negative or female die surface 1 in FIG. 6, comprises a hole punching die section 2, an outer profile punching die section 4, and a bead forming die section 3 tightly disposed between the hole punch die section 2 and outer profile punch die section 4 and is formed at its four corners with guide bushes 5 for guiding guide posts of a mail die.

Figure 7:
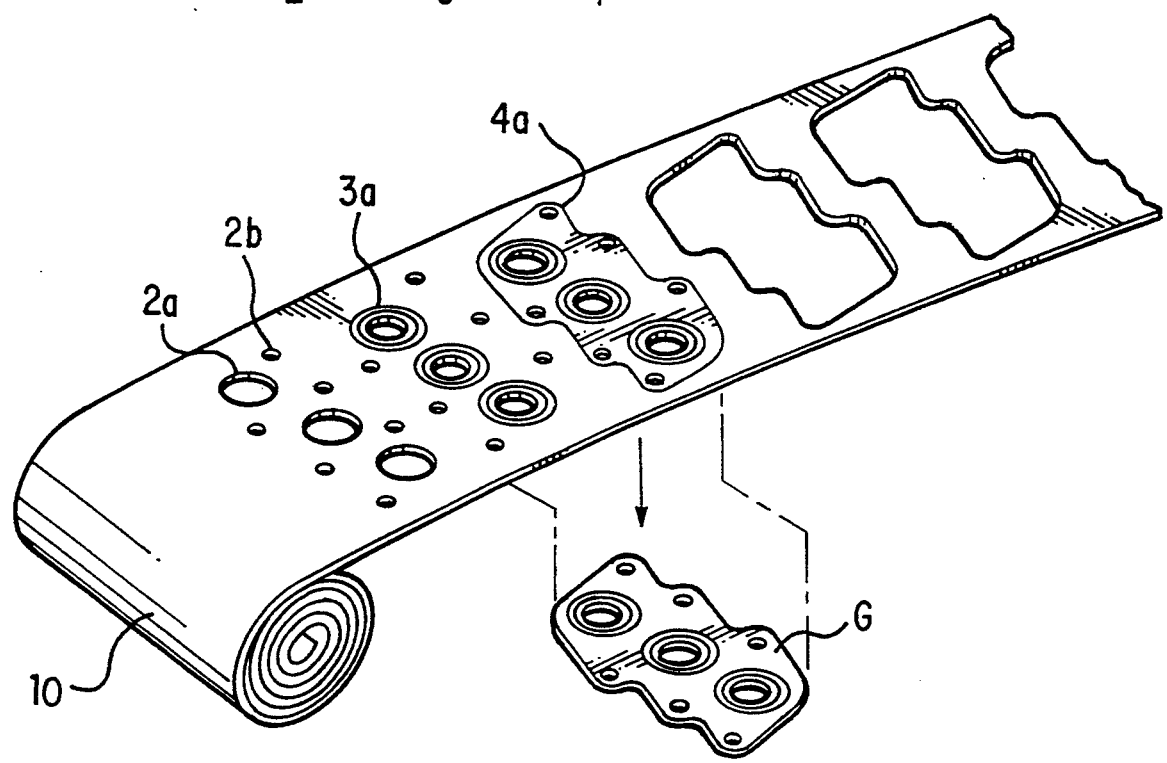

As a metal strip 10 shown in FIG. 7 is progressively fed, the male die, corresponding to the hole punching die section 2, bead forming die section 3 and outer profile punching die section 4 of the female die surface 1, is pressed against the progressive pressing die having such a female die surface 1 to punch cylinder holes 2a and bolt holes 2b, beads 3a surrounding the cylinder holes 2a, and an outer profile of gasket 4a in order, thereby forming a gasket G.

Various embodiments of bead forming metal dies constituting the progressive pressing die described above will be hereinafter described in detail.

FIGS. 1 through 5 are cross-sectional views showing male and female bead forming dies of the progressive pressing die along line A—A of FIG. 6. In the following embodiments, the same reference characters are used to designate members having same functions.

Embodiment 1

Figures 1A, 1B:
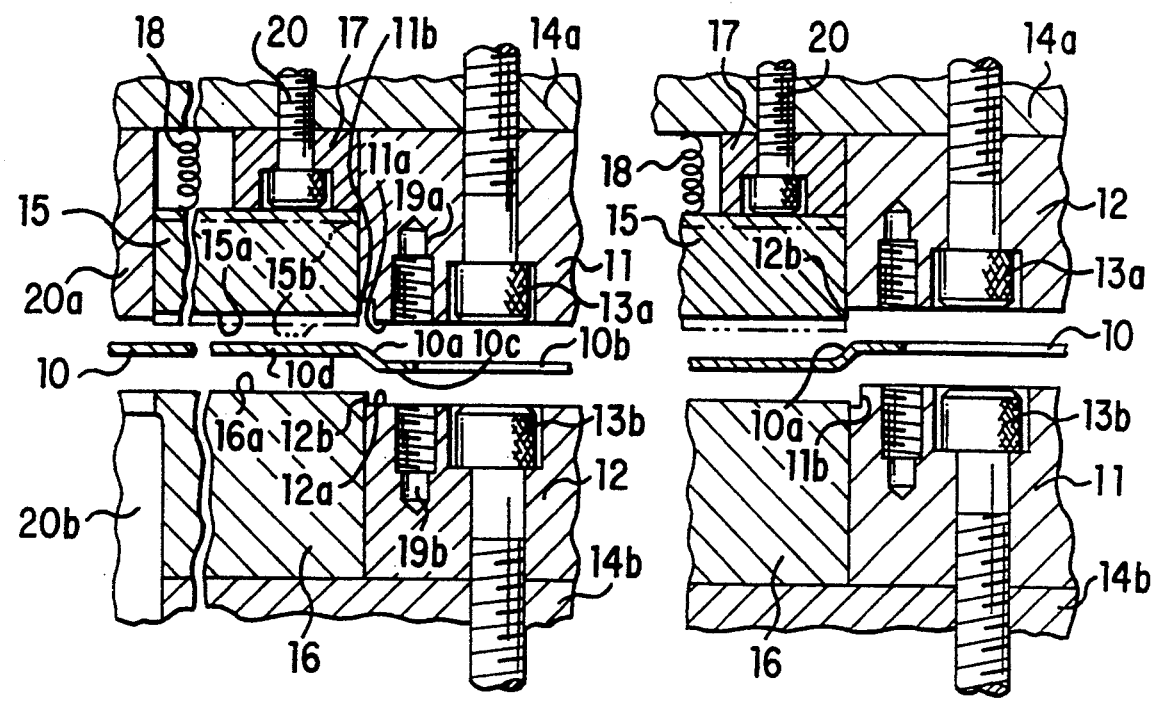

FIG. 1(a) shows a bead forming die apparatus for forming a step bead in a gasket.

This bead forming die apparatus comprises a pair of, upper and lower, inner bead boundary base blocks 11, 12, a stripper 15 disposed adjacent to the outer periphery of the upper inner bead boundary base blocks 11 for sliding movement, and a die 16 tightly adapted to the outer periphery of the lower inner bead boundary base blocks 11, 12. The stripper 15 is urged by a spring 18 disposed between the stripper 15 and an upper holder 14a toward the die 16. In a normal state, the stripper 15 is pressed down so as to place its working surface 15a in a spatial plane indicated by a double dotted line 15b.

Between the stripper 15 and the upper holder 14a there is a stopper 17, detachably secured by a bolt to the upper holder 14a which is adjusted in height so as to bring the working surface 15a of the stripper 15 into pressure contact with the working surface 16a of the die 16 when the working surfaces 11a and 12a of the upper and lower inner bead boundary base blocks 11, 12 are brought into pressure contact with each other.

The stripper 15 and die 16 are arranged side by side between the hole punching die section 2 and outer profile punching die section 4 shown in FIG. 6. Designated by 20a and 20b are a punch for punching out a cylinder hole disposed adjacent to the stripper 15 and a chute bore formed between the die 16 and the die holder 14b.

The die 16 is formed with an inner stepped edge 12b, which positions the working surface 12a of the lower inner bead boundary base block 1 lower than the working surface 16a of the die 16 so as to form a step corresponding in shape to the step of the bead 10a formed in the metal strip 10. The stopper 17 is adjusted in height so as to bring the working surfaces 11a and 12a of the upper and lower inner bead boundary blocks 11, 12 into contact with each other when the working surface 15a of the stripper 15 and the working surface 16a of the die 16 are brought into contact with each other.

The upper and lower inner bead boundary base blocks 11, 12 are formed with bolt holes 19a, 19b. Bolts are screwed into the bolts holes 19a, 19b when the upper and lower inner bead boundary base blocks 11, 12 are intended to be removed and are picked up for easy removal of the upper and lower inner bead boundary base blocks 11, 12.

For forming a desired stepped bead 10a in the metal strip 10 by the use of the press apparatus in accordance the above embodiment, the upper and lower die assemblies, after placing the metal strip 10 between them, are pressed together to punch out a cylinder hole 10b with the punch 20a. After opening the upper and lower die assemblies, the metal strip 10 is moved in a lengthwise direction by a predetermined distance to place the cylinder hole 10b in a position shown in FIG. 1(a). The upper and lower die assemblies are pressed together again to shape, with the bead forming die section 3, a bead 10a surrounding the cylinder hole 10b punched out with the punch 20a.

Because, during pressing, the working surface 15a of the stripper 15 is positioned by the spring 18 in a plane defined by the line 15b, namely the working surface 11a of the upper inner bead boundary base block 11, the metal strip 10 is compressively pinched between the stripper 15 and the die 16 at the beginning of pressing. With a progress of pressing, the stripper 15 is pushed up against the spring 18 by the die 16 applying a certain surface pressure to the die 16, so as to apply and press flat part 10c of the metal strip 10 surrounding the bead with a certain pressure. During pressing the flat part 10c by the working surface 11a of the upper outer bead-periphery base block 11 without producing unfairness, such as a wrinkle, due to strain, a bead 10a with a width of the step 10b is initially formed. When the stripper 15 is forced up and abuts against the stopper 17, the upper and lower inner bead boundary base blocks 11, 12 are brought into contact with each other, so as to form out-bead flat portion 10d and in-bead flat portion 10c in the metal strip 10.

Shown in FIG. 1(b) is a variant of the above described embodiment. In this variant, after removing the bolts 13a, 13b, the upper and lower inner bead boundary base blocks 11, 12, are replaced with each other and, then, fastened by the bolts 13a, 13b to the lower and upper holders 14b and 14a, respectively, and, further, the stopper 17 is adjusted in height so as to provide upper and lower steps 12b and 12b inversely related in position to those of the above embodiment shown in FIG. 1(a).

In order to replace the upper and lower inner bead boundary base blocks 11, 12 with each other, for instance, the upper and lower inner bead boundary base blocks 11, 12 are adjusted in height on the basis of the height of the die 16 and the stopper 17 is adjusted in height in such a way to provide a difference of height therebetween equal to a desired height of bead.

According to the structure, the steps 11b and 12b are inversely related in position to those of the above embodiment shown in FIG. 1(a) and the shape of bead is the opposite of the bead shown in FIG. 1(a).

Embodiment 2

Figures 2A, 2B:
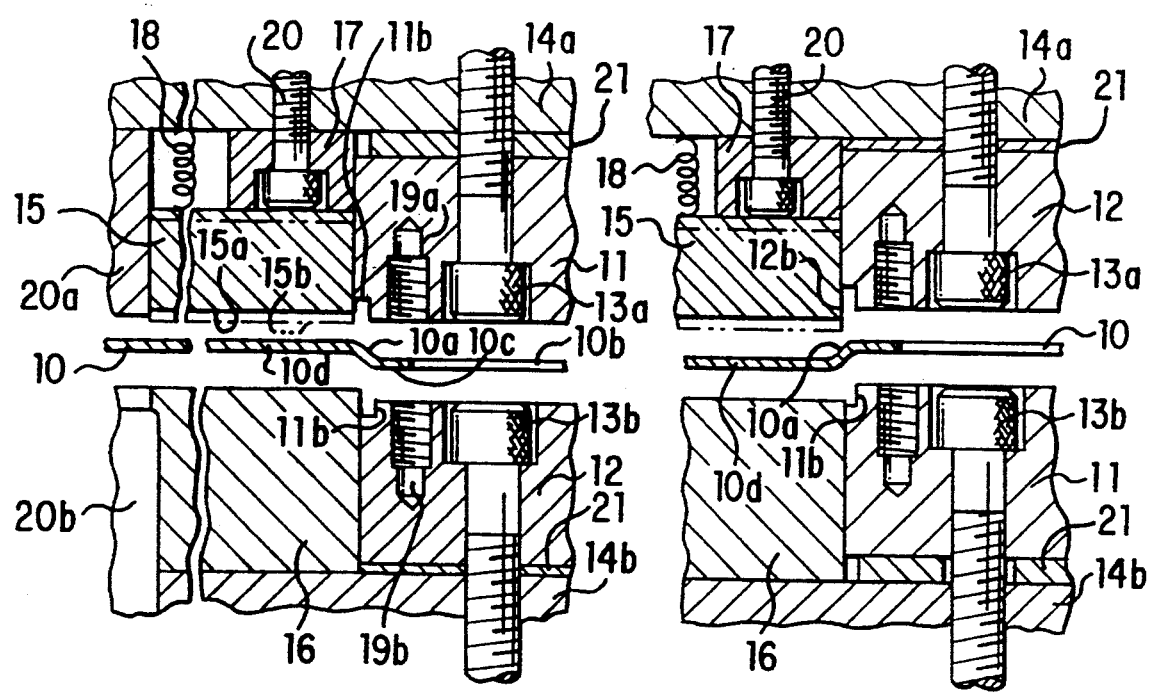
FIGS. 2(a), (b) are cross-sectional views showing part of a bead forming metal die whose upper and lower inner bead boundary base blocks are replaceable with each other.

Shown in FIGS. 2(a) and 2(b) is a bead forming die apparatus in which steps 11b and 12b having the same shape are formed in outer peripheries of the working surfaces of upper and lower inner bead boundary base blocks 11, 12, respectively, and height adjusting spacers 21 having certain thicknesses are disposed between the upper inner bead boundary base block 11 and an upper holder 14a, and the lower inner bead boundary base block 12 and a lower holder 14b, respectively. The upper and lower inner bead boundary base blocks 11, 12 shown in FIGS. 2(a) and 2(b) are reversely related in position in the same manner as in the embodiment 1. A stopper 17 is detachably mounted by a bolt 20 in the same manner as in the embodiment 1.

According to the bead forming die apparatus, replacing the upper and lower inner bead boundary base blocks 11, 12 with each other in the same manner as in the embodiment 1 allows to form step beads 10a which are reversely related in bead direction.

However, the embodiment 2 is different from the embodiment 1 in that the upper and lower inner bead boundary base blocks 11, 12 have the same height and are adjusted in height by the spacers 21. In this way, oppositely shaped beads are formed only by replacing in position and adjusting in height the upper and lower inner bead boundary base blocks 11, 12 provided in the same shape.

Embodiment 3

Figures 3A, 3B:
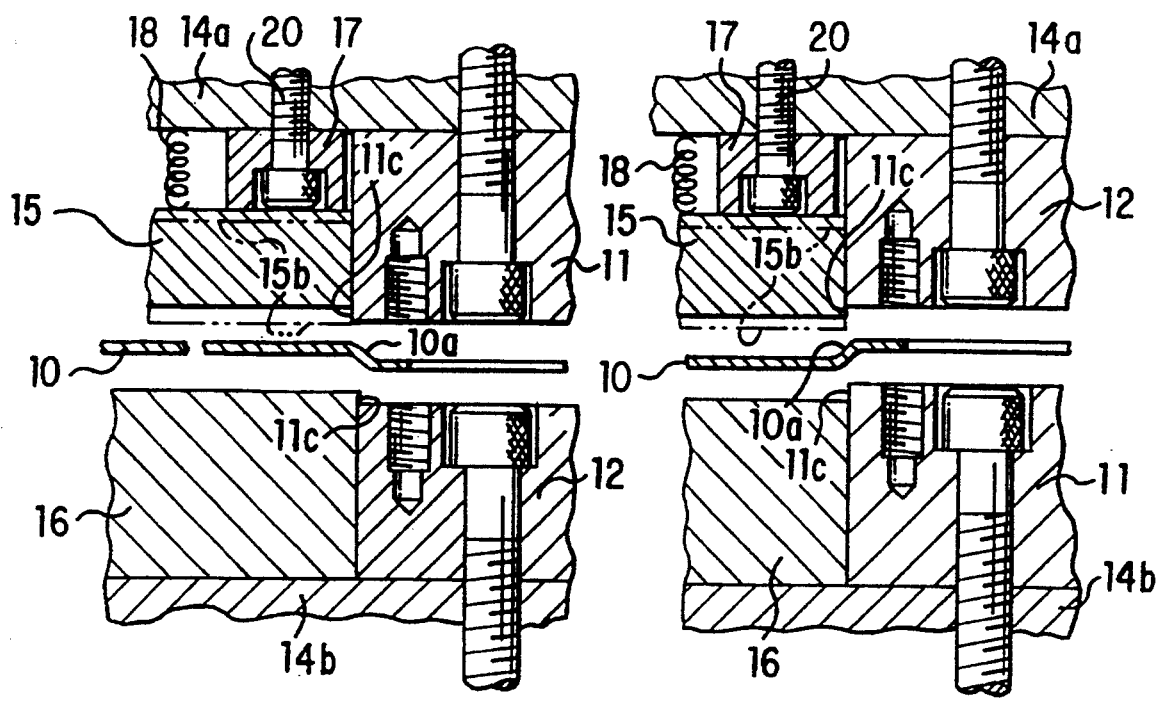
FIGS. 3(a), (b) are cross-sectional views showing part of a convex bead forming metal die.

Shown in FIGS. 3(a) and 3(b) is a bead forming die apparatus different from that shown in FIGS. 1(a) and 1(b) in that upper and lower inner bead boundary base blocks 11, 12 are not formed with any step 11b, 12b and that the lower inner bead boundary base block 12 is offset in a vertical direction relative to a die 16 by a distance equal to a vertical height of bead so as to form a step 11c. A stopper 17 is adjusted in vertical position to form, between the upper inner bead boundary base block 11 and the stopper 17, the step 11c similar to the steep 11c, formed between the lower inner bead boundary base block 12 and the die 16. The upper and lower inner bead boundary base blocks 11, 12 shown in FIGS. 3(a) and 3(b) are reversely related in position in the same manner as in the embodiments 1 and 2, so as to form beads whose shapes are opposite.

The bead forming die apparatus of this embodiment, although provided with the stripper 15 which is urged by a spring 18 to a position in a horizontal plane defined by a line 15b and performs the same function as that of the embodiment 1 and is necessary to be changed in thickness for replacing the upper and lower inner bead boundary base blocks 11, 12 with each other, has an advantage to be not necessarily formed with a step 11c.

Embodiment 4

Figures 4A, 4B:
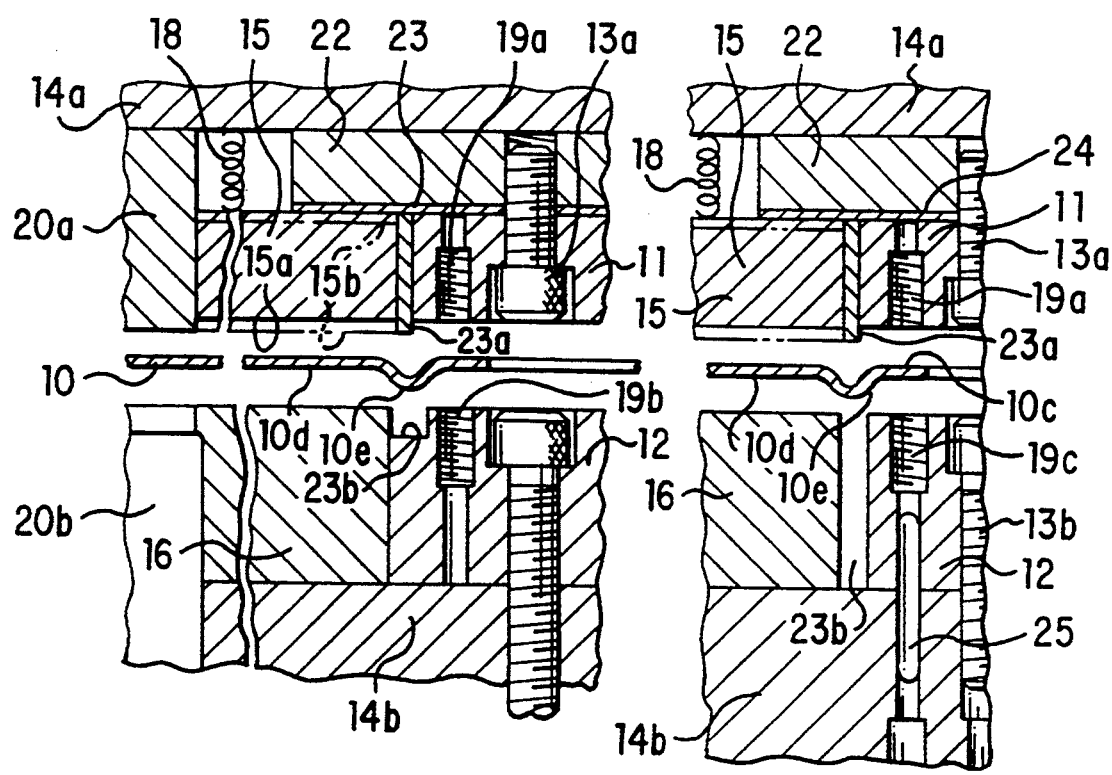
FIGS. 4(a), (b), (c) are cross-sectional views showing part of a convex bead forming metal die in accordance with another embodiment.

Shown in FIGS. 4(a) and 4(b) is a bead forming die apparatus for forming a convex bead 10e having a semi-circular cross section.

Because this convex bead forming die apparatus is not necessary to be formed with a step 11b which is essential for forming a step bead, the upper and lower inner bead boundary base blocks 11, 12 are adjusted in the same vertical positions as the stripper 15 and the die 16, respectively, and a spacer 22 may be disposed over the upper inner bead boundary base block 11 as well.

In this embodiment, the upper inner bead boundary base block 11 is provided with a concave projection forming member 23a fixed to the outer surface thereof, which is externally fitted with the stripper 15 for sliding movement. The stripper 15, similarly to the above embodiment, is urged by a spring 18 to placed its working surface 15a in a horizontal plane defined by a line 15b on which the tip end surface of the concave projection forming member 23a is and the lower inner bead boundary base block 12 is formed in the outer surface with a concave recess 23b corresponding to the convex projection forming member 23a.

Designated by numbers 22 and 24 are rigid spacers disposed between the convex projection forming member 23a and the stripper 15 and serving to prevent the convex projection forming member 23a from sinking during pressing.

The concave recess 23b may be formed either along the outer peripheral edge of the lower inner bead boundary base block 12 as shown in FIG. 4(a) or between the lower inner bead boundary base block 12 and the die 16 separately disposed at a certain radial distance. Because the die 16, although supporting and guiding the lower inner bead boundary base block 12 in the structure shown in FIG. 4(a), does not have such functional movement relative to the lower inner bead boundary base block 12 in the structure shown in FIG. 4(b), the lower inner bead boundary base block 12 is positioned relative to and firmly secured to the holder 14 by a knock pin 25.

In the convex bead forming die apparatus thus structured, the stripper 15 prevents the out-bead flat portion 10d from producing wrinkles due to a surface pressure against the die 16 during pressing and serves as a part of bead forming die to form the out-bead flat portion 10d.

Figure 4C:
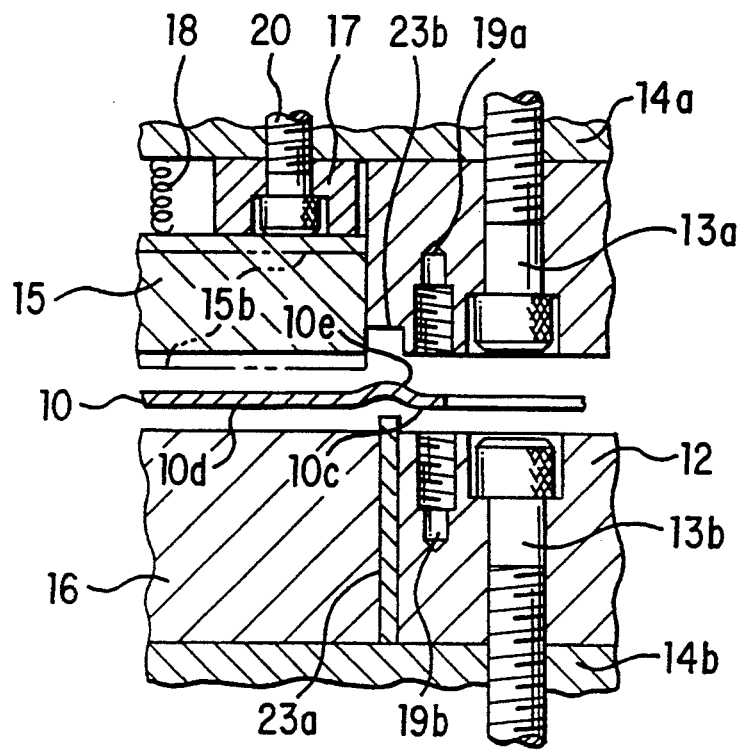

FIG. 4(c) shows a bead forming die apparatus for forming a convex bead having a shape of the opposite of the concave bead formed by the above embodiment.

This convex bead forming die apparatus, as is shown, has a convex projection forming member 23a and a concave recess 23b replaced with each other. The concave projection forming member 23a is disposed between and firmly fixed to the lower inner bead boundary base block 12 and the die 16. The concave recess 23b is formed along an outer periphery of the working surface of the upper inner bead boundary base block 11. This structure is not necessary to dispose any spacer on the upper inner bead boundary base block 11 for preventing the convex projection forming member 23a from sinking and therefore, the stopper 17 can be disposed around the upper inner bead boundary base block 11 similarly to the previous embodiments 1-3.

Embodiment 5

Figure 5A:
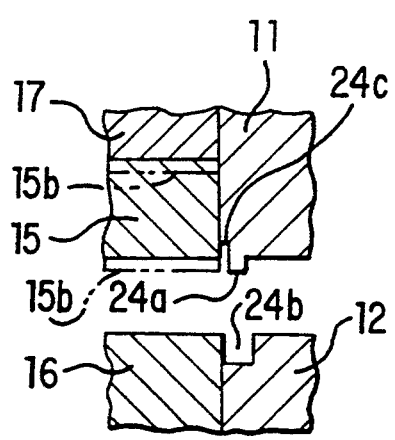
FIGS. 5(a), (b) are cross-sectional views showing part of a step bead forming metal die in accordance with another embodiment.
Figure 5B:
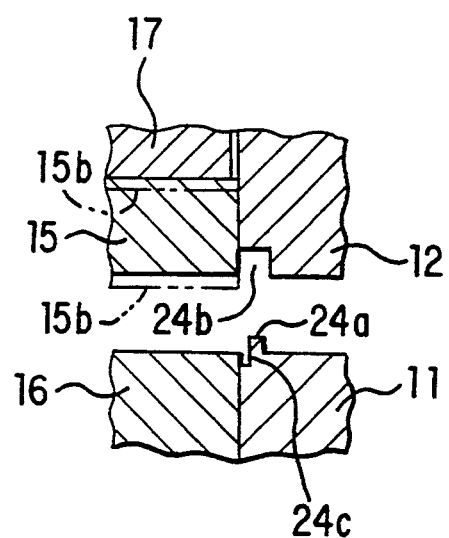

FIGS. 5(a) and 5(b) show a part of a convex bead forming die apparatus in accordance with another preferred embodiment of the invention.

The convex bead forming die apparatus, as shown in FIG. 5, does not use an embedded projecting member but has a convex projection 24a formed along a bead forming line of an upper inner bead boundary base block 11 and a concave recess 24b formed in a lower inner bead boundary base block 12 at a position corresponding to the concave recess 24b.

In the convex bead forming die apparatus of this type, the opposite shapes of beads can be formed either by replacing the upper and lower inner bead boundary base blocks 11 and 12 which are the same in thickness or by replacing the upper and lower inner bead boundary base blocks 11 and 12 with the use of a thickness adjusting spacer or thickness adjusting spacers.

Provided in the bead forming apparatus of any embodiment 1–5 is the step 11b, 24c formed along the outer peripheries of the upper and lower inner bead boundary base blocks 11 and 12 so as to have their bottom lines located either even with or lower than the working surfaces of the stripper 15 and die 16. Owing to such locations of the bottom line of the step, beads can be formed in good shape without being adversely affected by boundaries of the upper and lower inner bead boundary base blocks 11 and 12.

Figure 8:
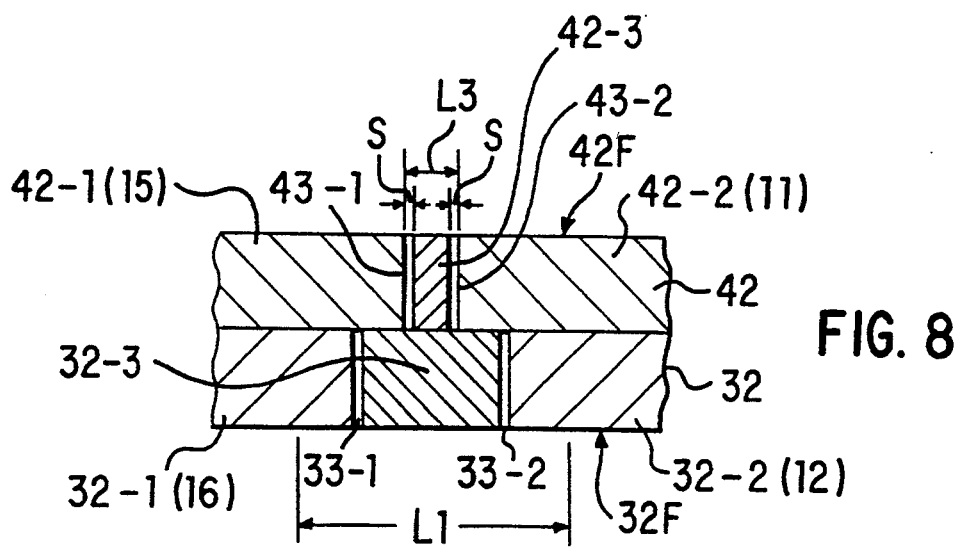
Figure 9:
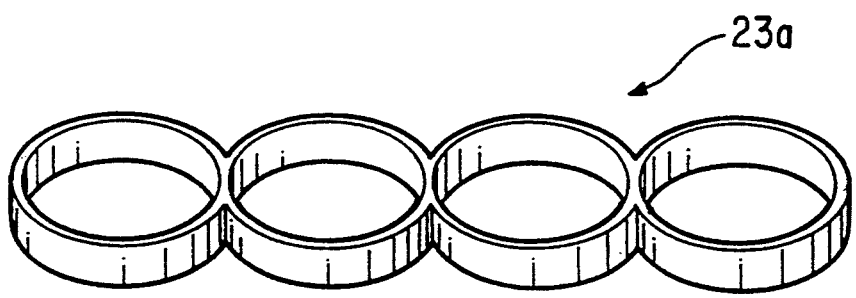
Figure 10:
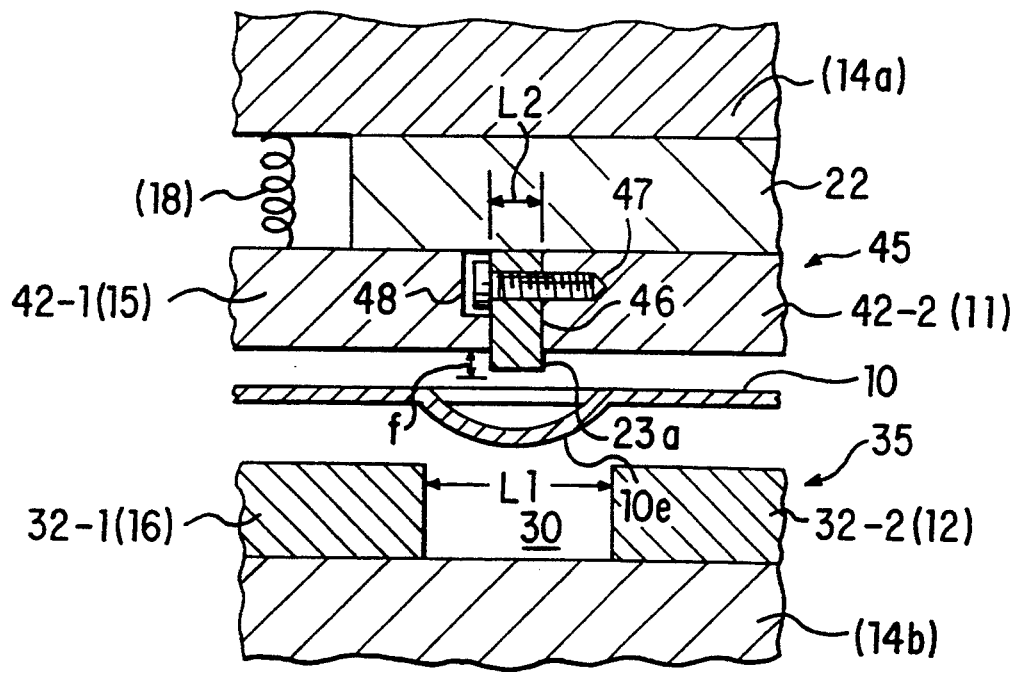

Preparing a convex bead forming apparatus will be described with reference to FIGS. 8–10.

A first metal base plate 32 is formed with two first slits 33-1, 33-2 by a cutter, such as a wire cutter, which are separated by a distance equal to the width L1 of a bead 10e to be formed in a elastic metal strip 10 and are substantially perpendicular to the base surface 32F of the first metal base plate 32. Then, after separating and removing an inner plate 32-3 from left and right plates 32-1 and 32-2, a female die 35 is provided by forming a groove-like opening 30 between the left and right plates 32-1 and 32-2. The female metal die 35 constitutes the female die comprising the die 16 and the lower inner bead boundary base block 12 shown in FIG. 4(b).

On the other hand, similarly to the first metal base plate 32, a second metal base plate 42, as the other metal base plate, is formed with two second slits 43-1, 43-2 by a cutter, such as a wire cutter, which are substantially perpendicular to the base surface 42F of the first metal base plate 32. Then, an inner plate 42-3 is removed from left and right plates 42-1 and 42-2 so as to form a groove 46 having a width of L2. A U-like opening 30 is provided between the left and right plates 32-1 and 32-2. A projection member 23a shown in FIG. 9, which has a thickness equal to the groove width of L2, is integrally formed by a cutter, such as a wire cutter, and is mounted providing a projection of a desired height of h.

For forming the projection member 23a, when forming the two second slits, each having a width of S, in the second metal base plate 42 by, for instance, a programmed wire cutter, a metal base plate, as a material of the projection member 23a, is cut by the wire cutter shifted outwardly to left or right by a distance equal to the slit width S. In such a way, an integral projection member 23a is formed with a high accuracy of width and shape, shown in FIG. 9, on the basis of the width of the groove 46 formed in the second metal base plate 46.

In order to mount the projection member 23a thus formed as shown in FIGS. 4(a) and 4(b), after fixing the upper inner bead boundary base block 11 to the upper holder 14b through the stopper 22, the projection member 23a is secured to the stopper 22 by a screw 47 in a recess 48, or otherwise, it is secured with adhesives. Thereafter, the stripper 15 is installed around the projection member 23a with the spring 18. In this case, because a slight clearance is necessary between the stripper 15 and the projection member 23a so as to allow the stripper 15 to slide along the outer surface of the projection member 23a, the clearance is taken into consideration when cutting the projection member 23a by the wire cutter.

The manner of forming the projection member 23a integrally cut out from the metal base plate is available not only to convex beads but also step beads shown in FIGS. 1–3.

According to the manner of forming the projection member 23a, it is easily performed by changing the width of the projection member and the width of a groove facing the projection member to modify partly the profile of a bead joined portion in cross-section and to form a projection member with narrow parts for beads having joined portions. The manner of forming the projection member 23a can equalize the change in pressure caused in the metal plate in which the bead is formed, so as to enable to form a continuous seal line. Contrary to this, because in the conventional manner in which a projection member is formed from a plate-like metal, it is difficult to change the width of the projection member, to modify the profile of a bead joined portion in cross-section is difficult even by changing the width of a groove facing the projection member. Pressure applied in the metal plate in which the bead is formed is uneven, so as to make it impossible to form a continuous seal line.

Possibility of Industrial Utilization

As described above, according to the present invention, the metal gasket bead forming metal die for forming convex bead or step bead in a metal strip, which can progressively perform three pressing steps, punching out holes, forming beads and punching out the profile, is useful in the contraction of manufacturing process for metal gaskets with beads, cutting down the manufacturing cost of metal gaskets, and improving the productivity of metal gaskets in large quantity.

Because of the provision of the stripper in the metal gasket bead forming metal die prevents the occurrence of wrinkles in a metal plate during forming beads, allows the working surfaces of the upper and lower inner bead boundary base blocks to be precisely adjusted in position, makes it possible to arrange the bead forming die adjacent to the hole punching die and the outer profile punching die side by side. Furthermore, due to the identical surface shapes of the stripper and the die facing the stripper, the upper and lower inner bead boundary base blocks can be made identical in shape, so as to make the opposite shapes of beads only by replacing the upper and lower inner bead boundary base blocks with each other.

We claim:

1. A method of forming a die apparatus comprising the steps of:

forming a first metal plate with two adjoining slits perpendicular to a surface of said first metal plate so as to surround an inner gasket portion;

removing a portion, between said adjoining slits, from said first metal plate so as to form an annular-like groove and provide a lower metal die;

forming a second metal plate with two adjoining slits perpendicular to a surface of said second metal plate so as to surround said inner gasket portion and be within an area corresponding to said annular-like groove;

removing a portion, between said adjoining slits, from said second metal plate so as to form an annular groove;

inserting a ring member in said annular groove so as to form an annular-like projection; and slidably receiving a stripper in said annular groove and around said ring member.

2. A method of forming a press-forming die apparatus for press-forming a sealing bead in a plate between forming a hole in the plate and punching out a gasket from the plate, said sealing bead dividing said gasket into an inner gasket portion including said hole and an outer gasket portion surrounding said inner gasket portion, said method comprising the steps of:

forming an upper die means for forming a front surface of said gasket by cutting a first base plate perpendicularly to a surface of said first base plate to divide said first base plate into an upper inner die block, having an upper inner die surface for forming a front surface of said inner gasket portion and an upper outer die block, having an upper outer die surface for forming a front surface of said outer gasket portion and fixedly holding said upper inner die block by an upper holder and externally fitting for sliding movement said upper outer die block onto said upper die block; and forming a lower die means for forming a back surface of said gasket by cutting a second base plate in a vertical direction with respect to a surface of said second base plate by cutting said second base plate perpendicularly to a surface of said second base plate to divide said second base plate into a lower inner die block, having a lower inner die surface for forming a back surface of said inner gasket portion and a lower outer die block having a lower outer die surface for forming a back surface of said outer gasket portion and fixedly holding said lower inner die block and said lower outer die block to a lower holder.

3. A method as defined in claim 2, wherein said press-forming die apparatus is configured to press-form a step sealing bead.

4. A method of forming a press-forming die apparatus for press-forming a convex sealing bead in a plate between forming a hole in the plate and punching out a gasket from the plate, said convex sealing bead dividing said gasket into an inner gasket portion including said hole and an outer gasket portion surrounding said inner gasket portion, said method comprising the steps of:

forming a first base plate with two adjacent cuts perpendicular to a surface of said first base plate according to a shape of said convex sealing bead and removing an in-between portion between said adjacent cuts from said first base plate so as to provide an upper inner die block having an upper inner die surface for forming a front surface of said inner gasket portion and an upper outer die block having an upper outer die surface for forming a front surface of said outer gasket portion, with an annular slot left between said upper inner die block and said upper outer die block and fixedly holding said upper inner die block by an upper holder and externally fitting for sliding movement said upper outer die block onto said upper inner die block;

cutting and forming an annular ring coinciding, in shape and width, with said annular slot from a second base plate;

inserting said annular ring into said annular slot so as to provide an upper die means for forming a front surface of said gasket; and forming a third base plate with two adjacent cuts perpendicular to a surface of said third base plate according to a shape and a width of said convex sealing bead and removing an in-between portion between said adjacent cuts from said third base plate so as to provide a lower die means for forming a back surface of said gasket comprising a lower inner die block having a lower inner die surface for forming a back surface of said inner gasket portion and a lower outer die block having a lower outer die surface for forming a back surface of said outer gasket portion, with an annular groove left between said lower inner die block and said lower outer die block and fixedly holding said lower inner die block and said lower outer die block to a lower holder.

5. A method as defined in claim 4, and further comprising the steps of fitting said upper outer die block onto said annular ring, after securing said annular ring to said upper inner die block with at least one of screws and adhesives, and suspending said annular ring from said upper holder through a compression spring.

* * * * *